United States Patent
Ikeuchi et al.

(10) Patent No.: US 12,549,907 B2
(45) Date of Patent: Feb. 10, 2026

(54) ULTRASONIC TRANSDUCER

(71) Applicant: Murata Manufacturing Co., Ltd., Nagaokakyo (JP)

(72) Inventors: Shinsuke Ikeuchi, Nagaokakyo (JP); Hiroshi Matsubara, Nagaokakyo (JP); Ryosuke Niwa, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 174 days.

(21) Appl. No.: 18/651,723

(22) Filed: May 1, 2024

(65) Prior Publication Data

US 2024/0284121 A1   Aug. 22, 2024

Related U.S. Application Data

(63) Continuation of application No. PCT/JP2022/043344, filed on Nov. 24, 2022.

(30) Foreign Application Priority Data

Nov. 26, 2021   (JP) .................... 2021-191704

(51) Int. Cl.
*H04R 17/10*     (2006.01)
*B06B 1/06*      (2006.01)
(Continued)

(52) U.S. Cl.
CPC ........... *H04R 17/10* (2013.01); *B06B 1/0648* (2013.01); *B06B 1/0666* (2013.01);
(Continued)

(58) Field of Classification Search
CPC ............ H04R 17/10; H04R 2201/003; B81B 7/0061; B81B 2201/0271; B06B 1/0666
(Continued)

(56) References Cited

U.S. PATENT DOCUMENTS 11,387,804 B2 *   7/2022   Robichaud ........... H03H 3/0072
12,364,501 B2 *   7/2025   Sverdlik ........ A61B 17/320068
(Continued)

FOREIGN PATENT DOCUMENTS

EP    0576216 A2    12/1993
JP    H066899 A     1/1994
(Continued)

OTHER PUBLICATIONS

International Search Report in PCT/JP2022/043344, mailed Jan. 31, 2023, 3 pages.
(Continued)

*Primary Examiner* — Thjuan K Addy
(74) *Attorney, Agent, or Firm* — Keating & Bennett, LLP

(57) ABSTRACT

An acoustic device includes an acoustic MEMS device. An acoustic path communicates with the acoustic MEMS device. Ultrasound generated by vibration of the acoustic MEMS device can resonate in the acoustic path. An ultrasonic transducer has sound pressure frequency characteristics such that sound pressure peaks occur as a result of a combination of resonance of the acoustic MEMS device and resonance in the acoustic path. A relationship of about $5 \leq (f0-f1)/f0 \times 100 \leq$ about 33 is satisfied, where f0 represents a resonance frequency of the acoustic MEMS device and f1 represents a frequency lower than the resonance frequency and closest to the resonance frequency among frequencies at which the sound pressure peaks occur in the sound pressure frequency characteristics.

20 Claims, 17 Drawing Sheets

(51) Int. Cl.
 B81B 7/00 (2006.01)
 G01S 15/10 (2006.01)
 H04R 1/02 (2006.01)

(52) U.S. Cl.
 CPC ............ B81B 7/0061 (2013.01); G01S 15/10 (2013.01); H04R 1/025 (2013.01); *B81B 2201/0257* (2013.01); *B81B 2201/0271* (2013.01); *B81B 2203/0127* (2013.01); *B81B 2203/019* (2013.01); *B81B 2207/07* (2013.01); *H04R 2201/003* (2013.01)

(58) Field of Classification Search
 USPC .......................................... 381/190, 150, 173
 See application file for complete search history.

(56) References Cited

U.S. PATENT DOCUMENTS

| | | |
|---|---|---|
| 2007/0154036 A1 | 7/2007 | Matsuzawa |
| 2014/0203684 A1 | 7/2014 | Yamamoto et al. |
| 2018/0167730 A1* | 6/2018 | Parker ................. H04R 19/005 |
| 2021/0135601 A1* | 5/2021 | Zhang ................. H10N 30/076 |
| 2022/0040736 A1 | 2/2022 | Umezawa et al. |

FOREIGN PATENT DOCUMENTS

| | | |
|---|---|---|
| JP | 2007195150 A | 8/2007 |
| JP | 2008199266 A | 8/2008 |
| WO | 2013051400 A1 | 4/2013 |
| WO | 2014174730 A1 | 10/2014 |
| WO | 2020230484 A1 | 11/2020 |

OTHER PUBLICATIONS

Written Opinion in PCT/JP2022/043344, mailed Jan. 31, 2023, 4 pages.

* cited by examiner

ULTRASONIC TRANSDUCER

CROSS REFERENCE TO RELATED APPLICATIONS

This application claims the benefit of priority to Japanese Patent Application No. 2021-191704 filed on Nov. 26, 2021 and is a Continuation application of PCT Application No. PCT/JP2022/043344 filed on Nov. 24, 2022. The entire contents of each application are hereby incorporated herein by reference.

BACKGROUND OF THE INVENTION

1. Field of the Invention

The present invention relates to ultrasonic transducers.

2. Description of the Related Art

WO2020/230484 as a prior art document discloses a configuration of an ultrasonic transducer. The ultrasonic transducer described in WO2020/230484 includes a mount substrate and a piezoelectric device. The piezoelectric device is mounted on the mount substrate. The piezoelectric device includes a substrate, a piezoelectric element, and a lid. A through hole is provided in the substrate. The piezoelectric element is located on a first main surface of the substrate. The mount substrate faces a second main surface of the substrate. A through hole is provided in the mount substrate. An end of the through hole in the mount substrate on a side of the piezoelectric device is located at a position where it faces the through hole in the substrate.

The ultrasonic transducer is required to be able to radiate ultrasound at a high sound pressure level over a wide frequency band.

SUMMARY OF THE INVENTION

Example embodiments of the present invention provide ultrasonic transducers each able to radiate ultrasound at a high sound pressure level over a wide frequency band.

An ultrasonic transducer according to an example embodiment of the present invention includes an acoustic device and an acoustic path. The acoustic device includes an acoustic MEMS device. The acoustic path communicates with the acoustic MEMS device. In the acoustic path, ultrasound generated by vibration of the acoustic MEMS device can resonate. The ultrasonic transducer has sound pressure frequency characteristics such that a plurality of sound pressure peaks occur as a result of combination of resonance of the acoustic MEMS device and resonance in the acoustic path. A relationship of about $5 \leq (f0-f1)/f0 \times 100 \leq$ about 33 is satisfied, where f0 represents a resonance frequency of the acoustic MEMS device and f1 represents a frequency lower than resonance frequency f0 and closest to resonance frequency f0 among frequencies at which the plurality of sound pressure peaks occur in the sound pressure frequency characteristics.

According to example embodiments of the present invention, ultrasound at a high sound pressure level is able to be radiated over a wide frequency band.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
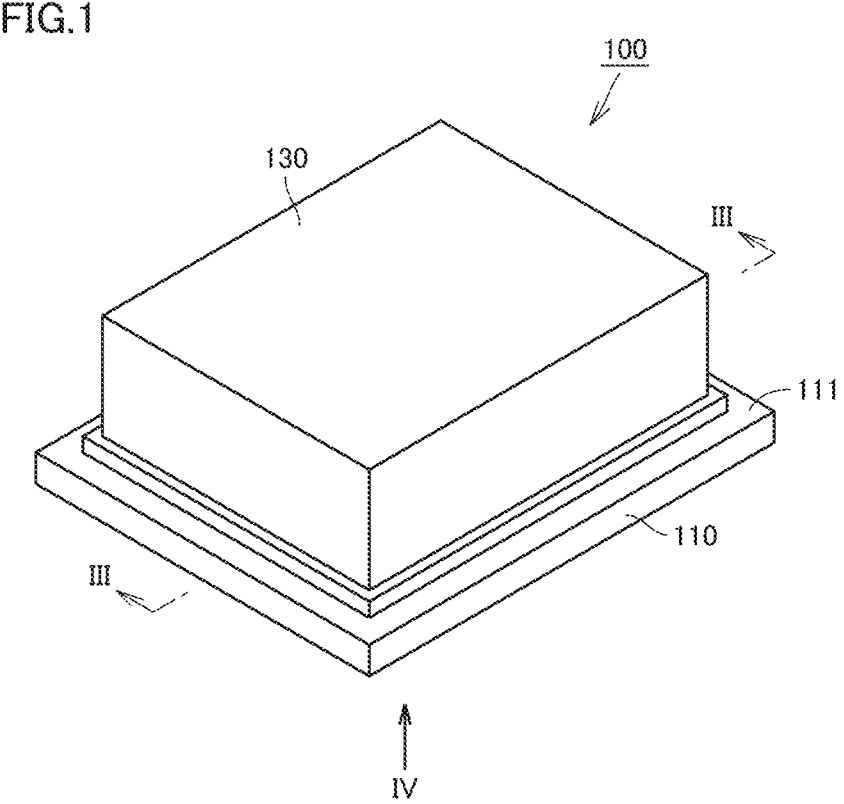
FIG. 1 is a perspective view showing an appearance of an acoustic device included in an ultrasonic transducer according to a first example embodiment of the present invention.

Ultrasonic transducers according to example embodiments of the present invention will be described below with reference to the drawings. In the description of the example embodiments, the same or corresponding elements in the drawings are denoted by the same reference characters and description thereof will not be repeated.

"MEMS" herein is an abbreviation of micro electro mechanical systems. An "acoustic MEMS device" is a collective denotation of an MEMS microphone, a piezoelectric micro-machined ultrasonic transducer (pMUT), a capacitive micro-machined ultrasonic transducer (cMUT), an MEMS speaker, and the like, for example.

First Example Embodiment

Figure 2:
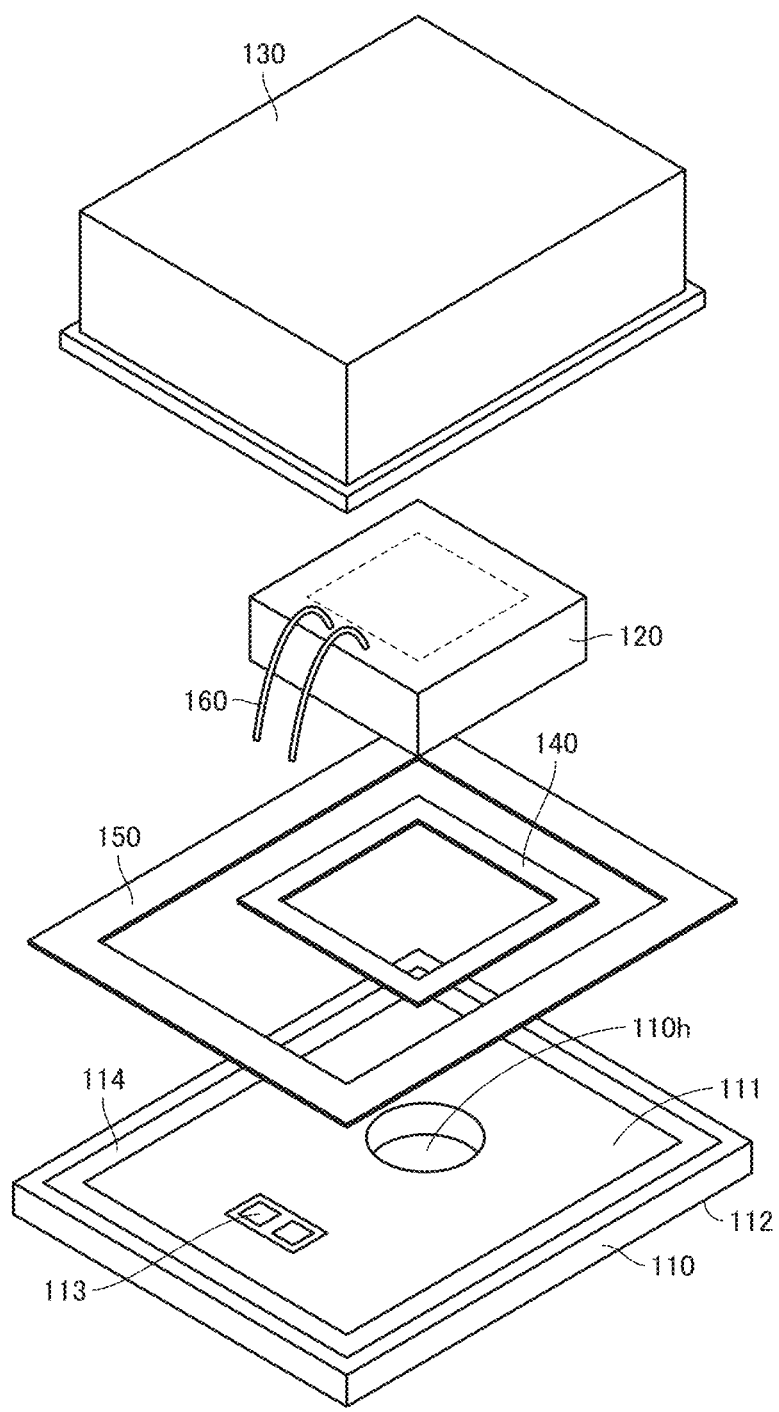
FIG. 2 is an exploded perspective view showing a configuration of the acoustic device included in the ultrasonic transducer according to the first example embodiment of the present invention.
Figure 3:
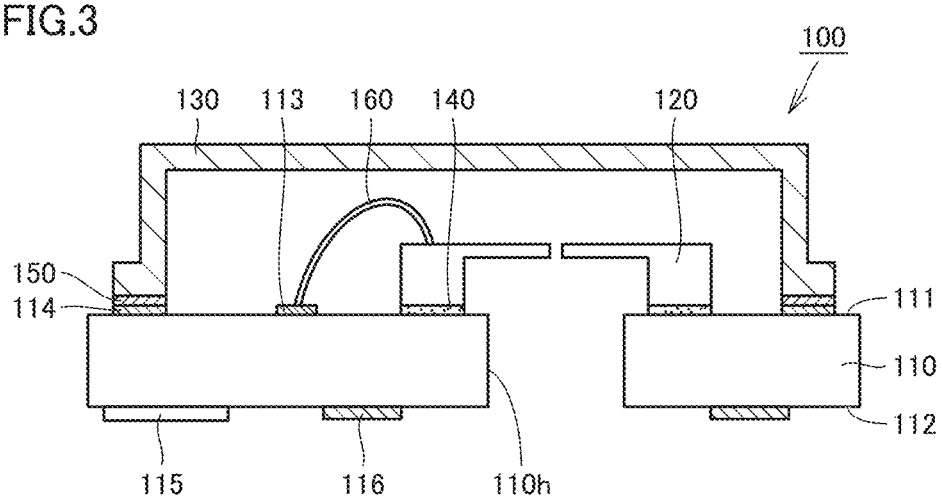
FIG. 3 is a cross-sectional view of the acoustic device in FIG. 1 along a direction shown with an arrow III-III.
Figure 4:
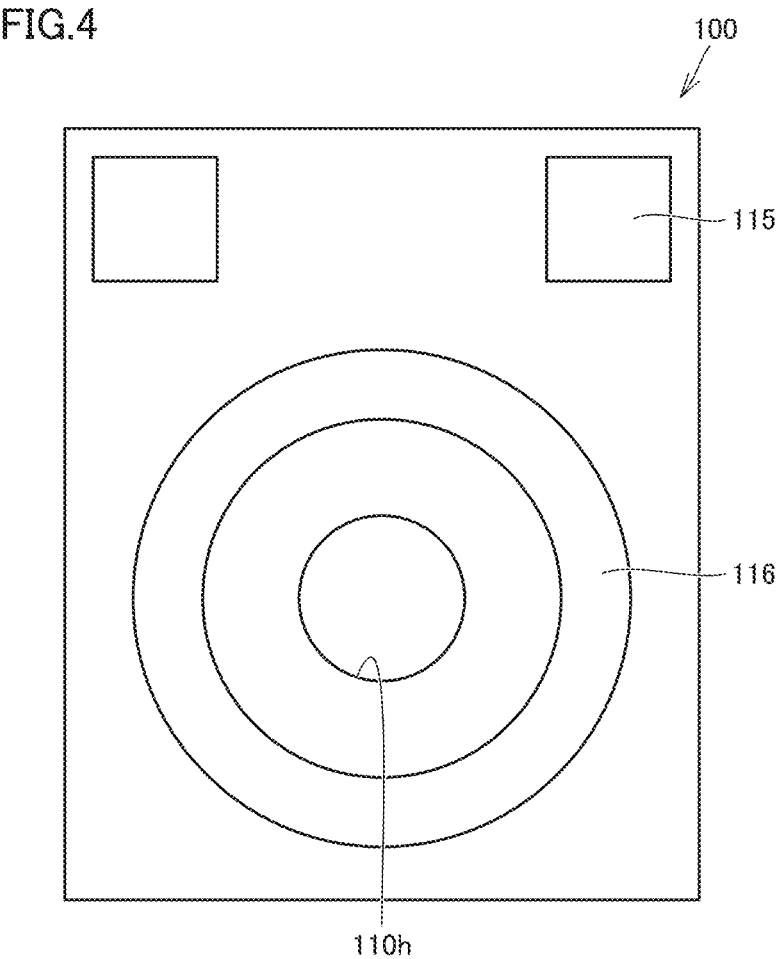
FIG. 4 is a bottom view of the acoustic device in FIG. 1 along a direction shown with an arrow IV.

FIG. 1 is a perspective view showing an appearance of an acoustic device included in an ultrasonic transducer according to a first example embodiment of the present invention. FIG. 2 is an exploded perspective view showing a configuration of the acoustic device included in the ultrasonic transducer according to the first example embodiment of the present invention. FIG. 3 is a cross-sectional view of the acoustic device in FIG. 1 along a direction shown with an arrow III-III. FIG. 4 is a bottom view of the acoustic device in FIG. 1 along a direction shown with an arrow IV.

As shown in FIGS. 1 to 4, an acoustic device 100 included in the ultrasonic transducer according to the first example embodiment of the present invention includes an acoustic MEMS device 120. Acoustic device 100 further includes a substrate 110 and a lid 130. Acoustic device 100 may further include, for example, an application specific integrated circuit (ASIC).

Substrate 110 includes a first main surface 111 and a second main surface 112. Substrate 110 includes a first through hole 110h that extends from first main surface 111 to second main surface 112.

Substrate 110 has a rectangular or substantially rectangular outer shape. A length of one side of substrate 110 is, for example, not smaller than about 1 mm and not larger than about 3 mm. Substrate 110 has a thickness of, for example, not smaller than about 0.1 mm and not larger than about 0.3 mm. A material for substrate 110 is a material, for example, which is combination of resin such as glass epoxy and glass fibers, low temperature co-fired ceramics (LTCC), or ceramic including alumina.

First main surface 111 of substrate 110 includes a plurality of first electrodes 113. First electrode 113 is electrically connected to a corresponding pad electrode of acoustic MEMS device 120 through a wire 160. In other words, acoustic MEMS device 120 and first electrode 113 are wire-bonded to each other. When an ASIC is mounted on first main surface 111, first electrode 113 is electrically connected to one electrode of the ASIC and another electrode of the ASIC is electrically connected to an electrode of acoustic MEMS device 120. On first main surface 111 of substrate 110, an electrode 114 with a frame shape is provided along an edge of substrate 110. Electrode 114 is electrically connected to a copper foil arranged on first main surface 111.

Second main surface 112 of substrate 110 includes a plurality of second electrodes 115 and a first annular electrode 116. In the present example embodiment, two second electrodes 115 are provided on second main surface 112 of substrate 110. Second electrode 115 is located on an outer side of first annular electrode 116. Second electrode 115 is electrically connected to corresponding first electrode 113 through a via electrode or the like, for example. Second electrode 115 is electrically connected to acoustic MEMS device 120 through first electrode 113 and wire 160. As will be described later, in mount of acoustic device 100 on a mount substrate, second electrode 115 is electrically connected to an electrode of the mount substrate.

First annular electrode 116 surrounds first through hole 110h. First annular electrode 116 is continuous in a circumferential direction to prevent sound leakage through between the mount substrate and acoustic MEMS device 120. In order to lower a Q factor of resonance of acoustic MEMS device 120, first annular electrode 116 may discontinuously be provided. First annular electrode 116 may have a circularly or substantially circular surrounding shape as shown in FIG. 4 or have a surrounding shape other than the circular or substantially circular shape.

First through hole 110h faces a later-described membrane portion of acoustic MEMS device 120. Although first through hole 110h is circular or substantially circular when viewed from a direction orthogonal or substantially orthogonal to first main surface 111, it may be rectangular or substantially rectangular. First through hole 110h has a diameter of, for example, not smaller than about 0.1 mm and not larger than about 1.4 mm.

Lid 130 is provided on first main surface 111 of substrate 110. Lid 130 is connected to electrode 114 with a conductive adhesive 150 being interposed. Conductive adhesive 150 is, for example, thermosetting. Lid 130 is bonded to first main surface 111 around the entire or substantially the entire circumference without a gap. Lid 130 covers and hides acoustic MEMS device 120, wire 160, electrode 114, and the like. Lid 130 covers acoustic MEMS device 120 while being spaced a distance from acoustic MEMS device 120. Lid 130 is in a shape in conformity with the edge of substrate 110 when viewed from the direction orthogonal or substantially orthogonal to first main surface 111.

Lid 130 is made of a conductive material. The material for lid 130 is, for example, metal or resin. Lid 130 is defined by a single member. Lid 130 is formed by, for example, pressing, cutting, or molding. Lid 130 has a thickness of, for example, not smaller than about 0.05 mm and not larger than about 0.3 mm. A height of lid 130 is adjusted not to be in contact with acoustic MEMS device 120 and wire 160. Lid 130 is electrically connected to first annular electrode 116 through conductive adhesive 150, electrode 114, the copper foil on first main surface 111, and a via electrode.

As shown in FIG. 3, acoustic MEMS device 120 is fixed to first main surface 111 by a die bonding agent 140 so as to cover first through hole 110h. Acoustic MEMS device 120 is bonded to first main surface 111 without any gap around the entire or substantially the entire circumference of a base portion which will be described later. Die bonding agent 140 is, for example, a thermosetting adhesive.

Figure 5:
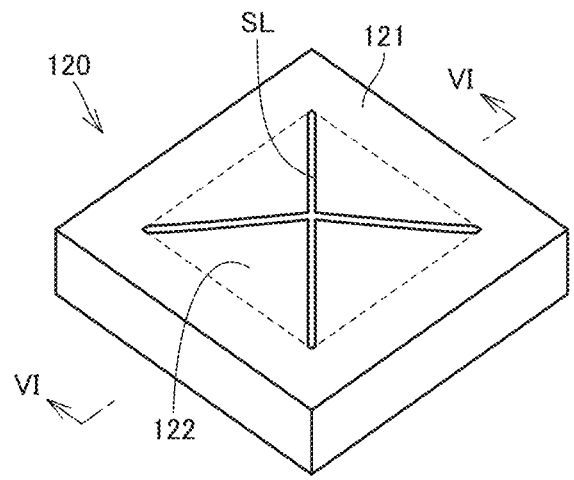
FIG. 5 is a perspective view showing an appearance of an acoustic MEMS device included in the ultrasonic transducer according to the first example embodiment of the present invention.
Figure 6:
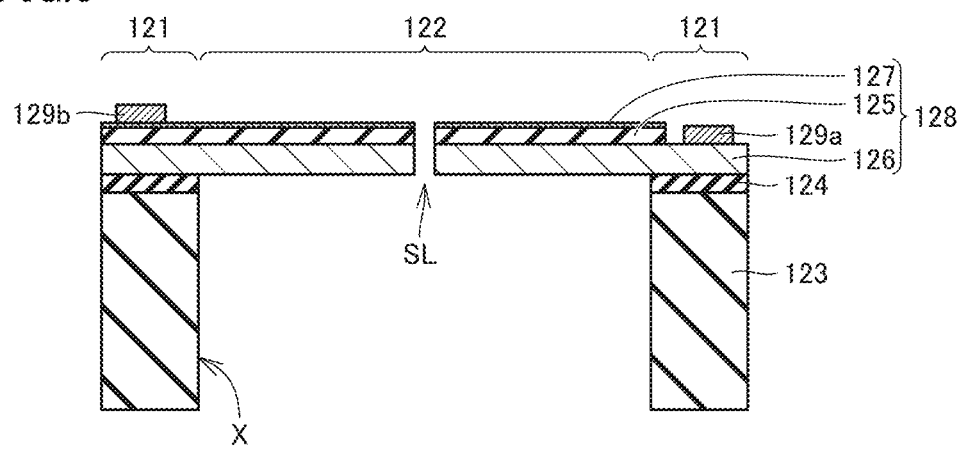
FIG. 6 is a cross-sectional view of the acoustic MEMS device in FIG. 5 along a direction shown with an arrow VI-VI.

FIG. 5 is a perspective view showing an appearance of the acoustic MEMS device included in the ultrasonic transducer according to the first example embodiment of the present invention. FIG. 6 is a cross-sectional view of the acoustic MEMS device in FIG. 5 along a direction shown with an arrow VI-VI.

As shown in FIGS. 5 and 6, acoustic MEMS device 120 includes a base portion 121 and a membrane portion 122. In the present example embodiment, acoustic MEMS device 120 is a piezoelectric element. Membrane portion 122 performs at least one of generation of vibration and detection of vibration by a piezoelectric body. Acoustic MEMS device 120 is not limited to the piezoelectric element, and may be configured to perform at least one of generation of vibration and detection of vibration in an electrostatic manner.

As shown in FIG. 6, acoustic MEMS device 120 includes a first pad electrode 129a and a second pad electrode 129b.

First pad electrode 129a is electrically connected through a not-shown connection line to a lower electrode layer which will be described later. Second pad electrode 129b is electrically connected through a not-shown connection line to an upper electrode layer which will be described later. First pad electrode 129a and second pad electrode 129b are electrically connected to first electrodes 113 of substrate 110 through wires 160.

Base portion 121 has a rectangular or substantially rectangular surrounding shape. The shape of base portion 121 is not limited to the rectangular or substantially rectangular surrounding shape, and may have a circular or substantially circular surrounding shape or a polygonal or substantially polygonal surrounding shape other than the rectangular or substantially rectangular shape. A length of one side of an outer edge of base portion 121 is, for example, not smaller than about 0.6 mm and not larger than about 1.5 mm. Base portion 121 has a thickness of, for example, not smaller than about 0.2 mm and not larger than about 0.5 mm.

Base portion 121 includes a support layer 123, an intermediate layer 124, and a multilayer body 128 including a plurality of layers. Support layer 123 is made of, for example, single-crystal silicon. Intermediate layer 124 is made of, for example, $SiO_2$.

Multilayer body 128 includes at least one of a piezoelectric body layer 125, an elastic body layer 126, an upper electrode layer 127, and the lower electrode layer. Piezoelectric body layer 125 is a single-crystal piezoelectric body made of, for example, lithium tantalate or lithium niobate. Piezoelectric body layer 125 may be made of a rotated Y-cut single-crystal piezoelectric body. Piezoelectric body layer 125 may be made of, for example, lead zirconate titanate (PZT), aluminum nitride (AlN), or a deposited film obtained by doping thereof with an impurity.

Elastic body layer 126 is made of, for example, Si. Elastic body layer 126 may be made of a material the same as the material for piezoelectric body layer 125 or a film obtained by doping the material with an impurity. Upper electrode layer 127 is made of a conductive material such as Pt, for example. The lower electrode layer is made of a conductive material such as Pt, for example. When elastic body layer 126 is formed from a film set to have a low resistance by doping of Si with an impurity, elastic body layer 126 can also define and function as the lower electrode layer and the lower electrode layer does not have to be separately provided.

Membrane portion 122 is located on an inner side of base portion 121 and supported by base portion 121. Acoustic MEMS device 120 is thus provided with a recess X surrounded by base portion 121 and membrane portion 122. Although membrane portion 122 has a square or substantially square outer geometry, it may have a circular or substantially circular or polygonal or substantially polygonal outer geometry. A length of one side of the outer geometry of membrane portion 122 is, for example, not smaller than about 0.5 mm and not larger than about 1.4 mm. Membrane portion 122 has a thickness of, for example, not smaller than about 0.5 μm and not larger than about 6.0 μm.

Membrane portion 122 includes a penetrating slit SL that passes through membrane portion 122. Membrane portion 122 thus includes a plurality of beam portions. Penetrating slit SL has a width of not larger than about 10 μm, for example. As the width of penetrating slit SL is smaller, sound leakage in membrane portion 122 can be reduced or prevented. In order to decrease the Q factor of resonance of membrane portion 122, penetrating slit SL may have a width of not smaller than about 3 μm, for example.

The beam portion of membrane portion 122 has a triangular or substantially triangular outer geometry when viewed from the direction orthogonal or substantially orthogonal to first main surface 111. The outer geometry of the beam portion of membrane portion 122 is not limited to the triangular or substantially triangular shape when viewed from the direction orthogonal or substantially orthogonal to first main surface 111 and may be a trapezoidal or substantially trapezoidal shape or a tip end side of the beam portion may be curved. A length dimension of the beam portion of membrane portion 122 is at least about five times as large as a thickness dimension of membrane portion 122 such that membrane portion 122 can readily vibrate. The beam portion of membrane portion 122 has a cantilever configuration. The beam portion of membrane portion 122 does not have to have the cantilever configuration, and a plurality of beam portions may be connected to one another at a portion other than base portion 121.

The beam portion of membrane portion 122 includes at least piezoelectric body layer 125, upper electrode layer 127, and the lower electrode layer. Upper electrode layer 127 is opposed to at least a portion of the lower electrode layer with piezoelectric body layer 125 being interposed. As shown in FIG. 6, when elastic body layer 126 also defines and functions as the lower electrode layer, upper electrode layer 127 is opposed to elastic body layer 126 with piezoelectric body layer 125 being interposed.

Membrane portion 122 has a neutral stress plane. The neutral stress plane is located in or substantially in the middle of the thickness of membrane portion 122. Piezoelectric body layer 125 is located opposite to a side of substrate 110, with respect to the neutral stress plane of membrane portion 122. Piezoelectric body layer 125 may be located on the side of substrate 110 with respect to the neutral stress plane of membrane portion 122.

Membrane portion 122 is bent by application of a potential difference between upper electrode layer 127 and the lower electrode layer, that is, application of a voltage to piezoelectric body layer 125. When membrane portion 122 is bent upon receiving ultrasound from the outside, charges are generated in piezoelectric body layer 125 and the potential difference is produced between upper electrode layer 127 and the lower electrode layer. A frequency at which an amplitude of bending caused by application of the voltage to piezoelectric body layer 125 or bending caused by reception of ultrasound by piezoelectric body layer 125 is a maximum, that is, for example, a resonance frequency of membrane portion 122, is not lower than about 20 kHz and not higher than about 60 kHz.

Operations of acoustic device 100 will now be described.

In transmission of ultrasound by acoustic device 100, by application of a voltage across two second electrodes 115, the voltage is applied across upper electrode layer 127 electrically connected to one second electrode and the lower electrode layer electrically connected to the other second electrode. Piezoelectric body layer 125 located between upper electrode layer 127 and the lower electrode layer is thus driven. As piezoelectric body layer 125 is driven, membrane portion 122 vibrates to generate ultrasound. This ultrasound is radiated through first through hole 110h to an external space.

In reception of ultrasound by acoustic device 100, ultrasound that has passed through first through hole 110h from the external space and reached membrane portion 122 vibrates membrane portion 122. Piezoelectric body layer 125 is thus driven to produce the potential difference between upper electrode layer 127 and the lower electrode layer which sandwich piezoelectric body layer 125 from opposing sides. This potential difference can be detected by two second electrodes 115 electrically connected to upper electrode layer 127 and the lower electrode layer, respectively. Acoustic device 100 can thus receive ultrasound.

A pulse echo technique is available as an example of a method of measuring a distance with the use of ultrasound. Specifically, ultrasonic pulses are transmitted toward a measurement target by application of a pulse voltage to acoustic device 100, ultrasonic pulses reflected by the measurement target are received after a lapse of a certain time period since transmission, and a distance to the measurement target is measured based on a time period from transmission until reception.

Ultrasonic pulses radiated from acoustic device 100 can be intensified or sensitivity of reception of ultrasonic pulses by acoustic device 100 can be improved by making use of resonance of membrane portion 122 of acoustic MEMS device 120 and resonance in an acoustic path which will be described later. In such a case, however, vibration of membrane portion 122 continues also after application of a pulse voltage, and what is called reverberation occurs. When the reverberation does not stop by the time of reception of ultrasonic pulses, acoustic device 100 is unable to receive ultrasonic pulses reflected by the measurement target.

Figure 7:
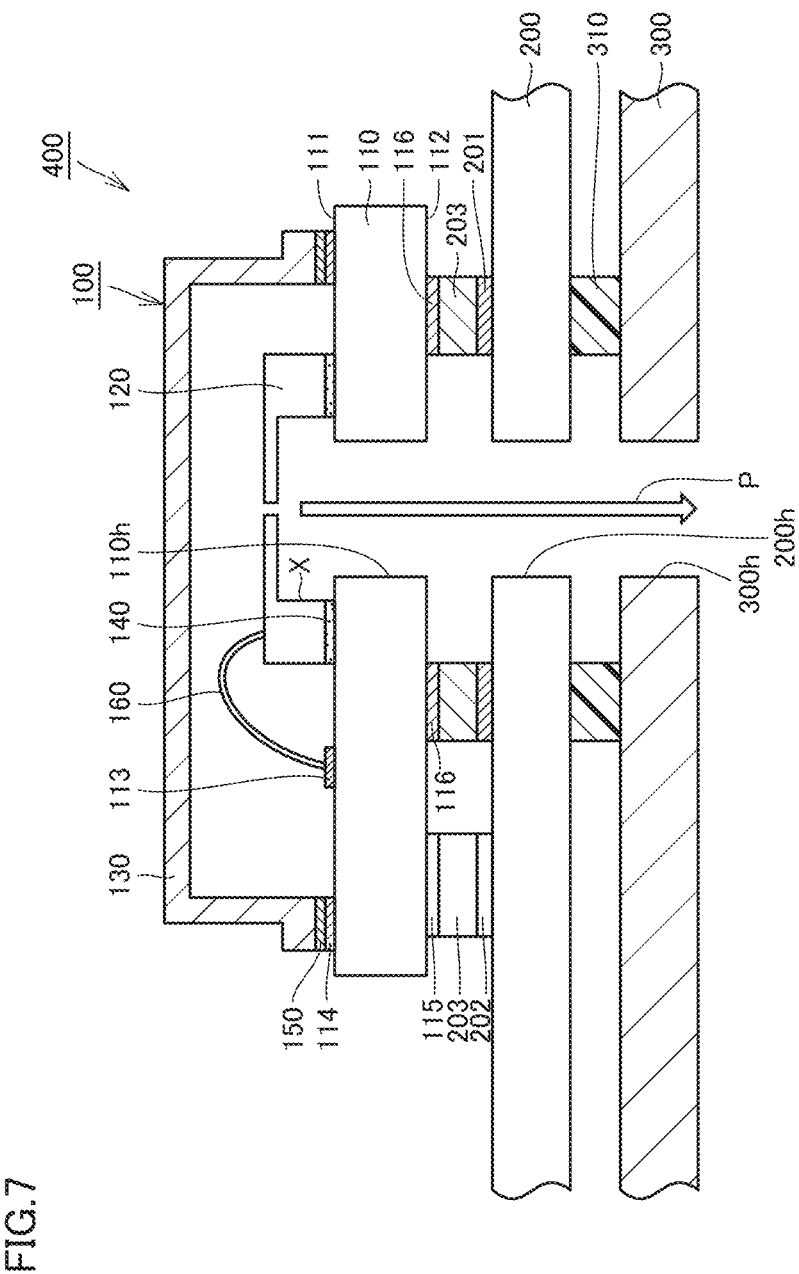
FIG. 7 is a cross-sectional view showing a configuration of the ultrasonic transducer according to the first example embodiment of the present invention.

A configuration of the ultrasonic transducer according to the first example embodiment of the present invention will now be described. FIG. 7 is a cross-sectional view showing the configuration of the ultrasonic transducer according to the first example embodiment of the present invention. As shown in FIG. 7, an ultrasonic transducer 400 according to the first example embodiment of the present invention includes acoustic device 100 and an acoustic path P. Acoustic path P is constructed to pass through substrate 110, a mount substrate 200, and a housing 300. Specifically, acoustic device 100 is attached to the inside of housing 300 of an electronic device as being mounted on mount substrate 200.

Mount substrate 200 faces second main surface 112 of substrate 110. On a surface of mount substrate 200 on a side of substrate 110, a plurality of third electrodes 202 are formed. Each of the plurality of third electrodes 202 is electrically connected to corresponding second electrode 115 by solder 203.

Mount substrate 200 is provided with a second through hole 200h. An end of second through hole 200h on the side of substrate 110 is located at a position where it faces first through hole 110h. Second through hole 200h is linearly provided until it reaches a surface of mount substrate 200 opposite to the side of substrate 110 from the surface of mount substrate 200 on the side of substrate 110. Second through hole 200h has a diameter of, for example, not smaller than about 0.4 mm and not larger than about 1.2 mm.

On the surface of mount substrate 200 on the side of substrate 110, a second annular electrode 201 located to surround second through hole 200h is provided. Second annular electrode 201 is electrically connected to first annular electrode 116 of substrate 110 by solder 203. An amount of leakage of ultrasound through between acoustic device 100 and mount substrate 200 to the outside when ultrasound passes through between first through hole 110h and second through hole 200h can be adjusted. Specifically, in an example where first annular electrode 116 is discontinuously provided, the amount of leakage of ultrasound can be adjusted by varying a size of a portion where first annular electrode 116 is not formed.

A material for mount substrate 200 is, for example, a material which is a combination of resin such as glass epoxy and glass fibers, low temperature co-fired ceramics (LTCC), or ceramic composed of alumina. Mount substrate 200 may be, for example, a flexible substrate made of a copper foil and polyimide or a composite substrate including a reinforcement plate in addition thereto. Mount substrate 200 has a thickness of, for example, not smaller than about 0.1 mm and not larger than about 2.0 mm.

Acoustic device 100 mounted on mount substrate 200 is accommodated in housing 300. Housing 300 includes a third through hole 300h that faces second through hole 200h in mount substrate 200. Third through hole 300h has a diameter of, for example, not smaller than about 0.4 mm and not larger than about 4.0 mm. Although a length of third through hole 300h depends on a thickness of housing 300, it is, for example, not smaller than about 0.4 mm and not larger than about 3.0 mm.

A sealing portion 310 is provided between housing 300 and mount substrate 200. Sealing portion 310 is surrounds second through hole 200h and third through hole 300h. Sealing portion 310 has a surrounding shape. Sealing portion 310 is continuous in the circumferential direction in order to prevent sound leakage through between housing 300 and mount substrate 200. An inner edge of sealing portion 310 is circular or substantially circular or rectangular or substantially rectangular. Sealing portion 310 has an inner diameter of, for example, not smaller than about 0.4 mm and not larger than about 3.0 mm. Sealing portion 310 has a thickness of, for example, not smaller than about 0.1 mm and not larger than about 1.0 mm. Sealing portion 310 is made of resin, for example.

As shown in FIG. 7, in ultrasonic transducer 400, acoustic MEMS device 120, first through hole 110h, first annular electrode 116, second annular electrode 201, second through hole 200h, sealing portion 310, and third through hole 300h provide acoustic path P which defines and functions as a path of ultrasound. In other words, acoustic path P communicates with acoustic MEMS device 120. In the present example embodiment, acoustic path P linearly extends.

A dripproof film or a dustproof film to prevent entry of foreign matter and a water droplet may be provided at any position in acoustic path P. A mesh made of, for example, metal or resin or a flexible film made of polytetrafluoroethylene (PTFE) may be applicable as the dripproof film or the dustproof film.

Acoustic path P has frequency response to ultrasound and resonates at a specific natural frequency. In other words, acoustic path P has a resonance frequency. In acoustic path P, ultrasound generated by vibration of acoustic MEMS device 120 can resonate. Acoustic MEMS device 120, on the other hand, has a resonance frequency specific to membrane portion 122 as described above.

Although Helmholtz resonance or air column resonance has been known as a method of deriving a resonance frequency of the acoustic path, it is difficult to apply such a method to a complicated acoustic path such as acoustic path P above.

In ultrasonic transducer 400, membrane portion 122 of acoustic MEMS device 120 is very small in thickness, and thus the membrane portion and air in acoustic path P affect each other in a vibrating state. Therefore, the resonance frequency of acoustic MEMS device 120 and the resonance frequency in acoustic path P cannot be separated from each other. It is thus difficult to widen a frequency band within which strong ultrasound can be radiated by setting the resonance frequency of acoustic MEMS device 120 and the resonance frequency in acoustic path P adjacently to each other in ultrasonic transducer 400.

A mechanism that allows radiation of ultrasound at a high sound pressure level over a wide frequency band in ultrasonic transducer 400 according to the first example embodiment of the present invention will now be described.

Initially, sound pressure frequency characteristics of five ultrasonic transducer samples different in resonance frequency in acoustic path P based on variation in length and width of acoustic path P were analyzed by simulation.

Figure 8:
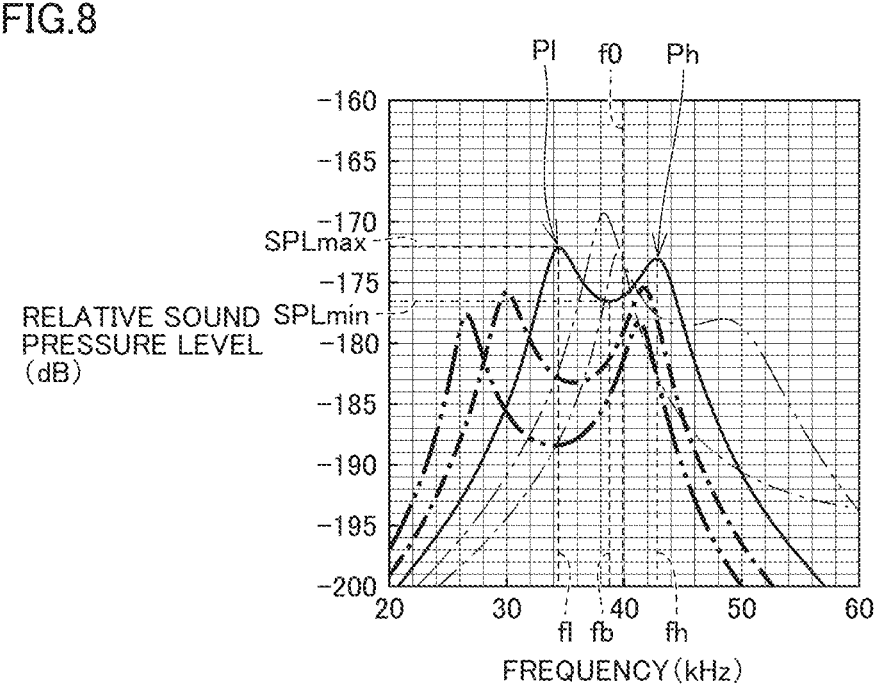
FIG. 8 shows a graph of sound pressure frequency characteristics of ultrasonic transducers different in resonance frequency in an acoustic path.

FIG. 8 shows a graph of sound pressure frequency characteristics of ultrasonic transducers different in resonance frequency in the acoustic path. In FIG. 8, a relative sound pressure level (dB) is shown on the ordinate and a frequency (kHz) is shown on the abscissa. A first sample is shown with a thin chain dotted line, a second sample is shown with a thin chain double-dotted line, a third sample is shown with a solid line, a fourth sample is shown with a bold chain dotted line, and a fifth sample is shown with a bold chain double-dotted line.

Analysis by simulation of the five samples was conducted, with three types of resonance frequencies f0 of acoustic MEMS device 120 which were about 32 kHz, about 40 kHz, and about 46 kHz being set. FIG. 8 shows the sound pressure frequency characteristics when resonance frequency f0 of acoustic MEMS device 120 was set to about 40 kHz.

Resonance frequency f0 of acoustic MEMS device 120 can be identified and confirmed by observing impedance frequency characteristics in a vacuum atmosphere. Resonance frequency f0 may be confirmed also in such a simplified manner as observing the impedance frequency characteristics while second through hole 200h in mount substrate 200 is closed.

As shown in FIG. 8, each of the first sample to the fifth sample had two sound pressure peaks. Two or more sound pressure peaks may appear. The ultrasonic transducers as the first sample to the fifth sample had such sound pressure frequency characteristics that a plurality of sound pressure peaks occurred as a result of combination of resonance of acoustic MEMS device 120 and resonance in acoustic path P.

Of frequencies at which the plurality of sound pressure peaks occurred in the sound pressure frequency characteristics, a frequency lower than resonance frequency f0 and closest to resonance frequency f0 is defined as f1 and a sound pressure peak thereof is defined as Pl. Of the frequencies at which the plurality of sound pressure peaks occurred in the sound pressure frequency characteristics, a frequency higher than resonance frequency f0 and closest to resonance frequency f0 is defined as fh and a sound pressure peak thereof is defined as Ph. A higher sound pressure level of the level at sound pressure peak Pl and the level at sound pressure peak Ph is defined as SPLmax and a sound pressure level lowest between frequency f1 and frequency fh is defined as SPLmin.

Figure 9:
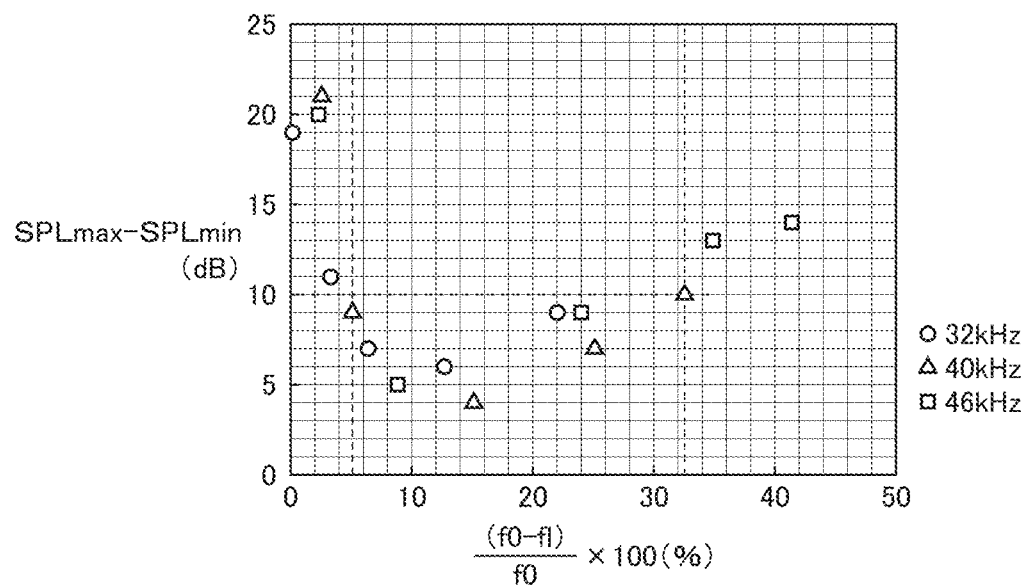
FIG. 9 shows a graph of relationship between $(f0-f1)/f0$ and $(SPLmax-SPLmin)$.

FIG. 9 shows a graph of relationship between (f0−f1)/f0 and (SPLmax−SPLmin). In FIG. 9, (SPLmax−SPLmin) (dB) is shown on the ordinate and (f0−f1)/f0×100(%) is shown on the abscissa. Resonance frequencies f0 of about 32 kHz, about 40 kHz, and about 46 kHz are shown with a circle, a triangle, and a quadrangle, respectively.

As shown in FIG. 9, within a range of about 5≤(f0−f1)/f0×100≤about 33, (SPLmax−SPLmin), that is, a difference between the sound pressure peaks between frequency f1 and frequency fh, was about 10 dB or lower.

Figure 10:
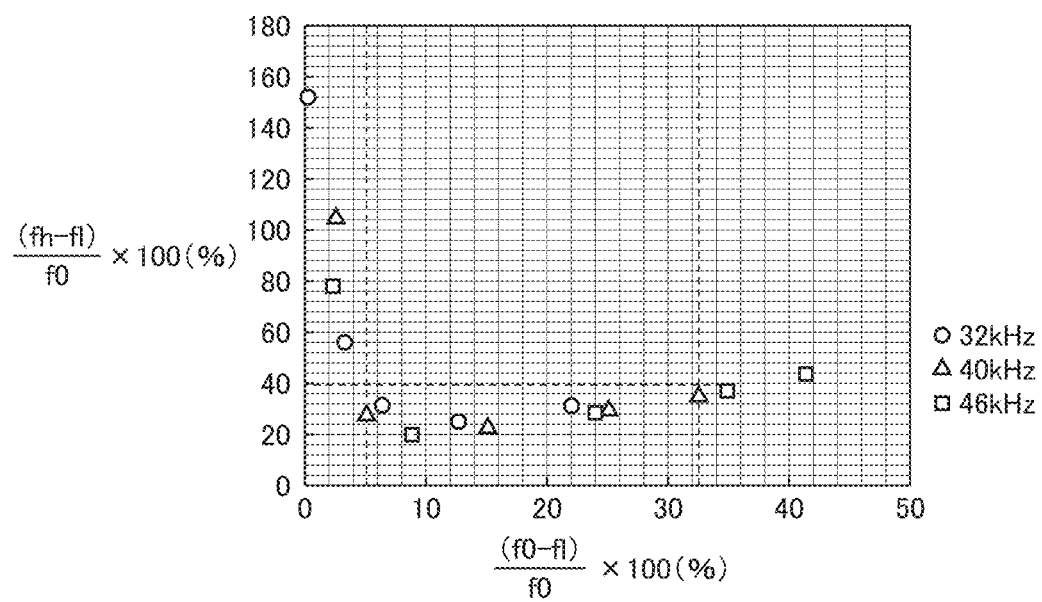
FIG. 10 shows a graph of relationship between $(f0-f1)/f0$ and $(fh-f1)/f0$.

FIG. 10 shows a graph of a relationship between (f0−f1)/f0 and (fh−f1)/f0. In FIG. 10, (fh−f1)/f0×100(%) is shown on the ordinate and (f0−f1)/f0×100(%) is shown on the abscissa. Resonance frequencies f0 of about 32 kHz, about 40 kHz, and about 46 kHz are shown with a circle, a triangle, and a quadrangle, respectively.

As shown in FIG. 10, relationship of about 20≤(fh−f1)/f0×100≤about 40 was satisfied within the range of about 5≤(f0−f1)/f0×100≤about 33.

It could be confirmed from results of analysis by simulation that ultrasonic transducer 400 having such sound pressure frequency characteristics that a relationship of about 5≤(f0−f1)/f0×100≤about 33 was satisfied, with f1 representing a frequency lower than resonance frequency f0 and closest to resonance frequency f0 among frequencies at which the plurality of sound pressure peaks occurred as a result of combination of resonance of acoustic MEMS device 120 and resonance in acoustic path P, could have a difference in sound pressure within about 10 dB over a wide frequency band which was not lower than about 20% and not higher than about 40% (for example, a range not lower than about 8 kHz and not higher than about 16 kHz when f0 was f0=about 40 kHz) of resonance frequency f0 with the peak sound pressure levels being inclusive at opposing ends. In other words, ultrasonic transducer 400 having such sound pressure frequency characteristics as satisfying a relationship of about 5≤(f0−f1)/f0×100≤about 33 can radiate ultrasound at the high sound pressure level over the wide frequency band.

When ultrasonic transducer 400 according to the present example embodiment radiates ultrasound at a frequency within the frequency band not lower than f1 and not higher than fh through acoustic path P to the outside, a high sound pressure is obtained in a stable manner within the frequency band not lower than f1 and not higher than fh. Therefore, even when resonance frequencies f0 of acoustic MEMS devices 120 in a plurality of ultrasonic transducers 400 are varied, difference in sound pressure frequency characteristics among these ultrasonic transducers 400 can be lessened. In addition, temperature characteristics of ultrasonic transducer 400 can be stabilized.

Ultrasonic transducer 400 according to the present example embodiment can select a frequency of ultrasound to be radiated through acoustic path P to the outside from among a plurality of frequencies within the frequency band not lower than f1 and not higher than fh. Since a high sound pressure is obtained in a stable manner within the frequency band not lower than f1 and not higher than fh in ultrasonic transducer 400 according to the present example embodiment, ultrasound can be radiated through acoustic path P to the outside at the frequency selected from among the plurality of frequencies within the frequency band not lower than f1 and not higher than fh. Therefore, in an example where a plurality of ultrasonic transducers 400 are used, selective use of the frequency of ultrasound to be radiated therefrom within the frequency band not lower than f1 and not higher than fh can prevent a crossed-wire phenomenon and facilitate ultrasonic modulation.

In radiation by ultrasonic transducer 400 according to the present example embodiment, of ultrasound at a frequency fb at which the sound pressure is lowest within the frequency band not lower than f1 and not higher than fh through acoustic path P to the outside, ultrasonic transducer 400 can be used in a region where variation in sound pressure frequency characteristics is least, and thus robustness of ultrasonic transducer 400 can be enhanced.

Second Example Embodiment

An ultrasonic transducer according to a second example embodiment of the present invention will be described below with reference to the drawings. Since the ultrasonic transducer according to the second example embodiment of the present invention is different from the ultrasonic transducer according to the first example embodiment of the present invention in configuration of an acoustic path, the configuration the same as or similar to that of the ultrasonic transducer according to the first example embodiment of the present invention will not be repeated.

Figure 11:
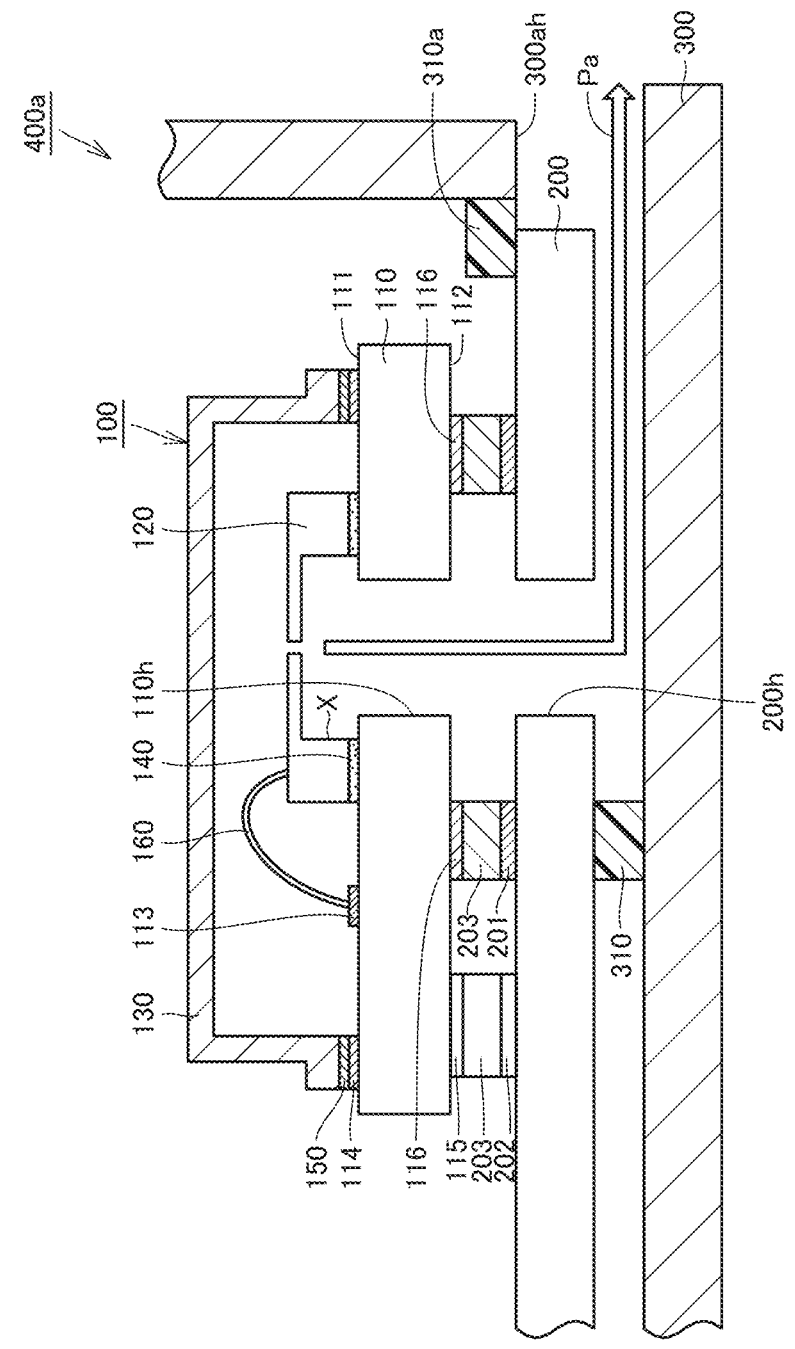
FIG. 11 is a cross-sectional view showing a configuration of an ultrasonic transducer according to a second example embodiment of the present invention.

FIG. 11 is a cross-sectional view showing a configuration of the ultrasonic transducer according to the second example embodiment of the present invention. As shown in FIG. 11, an ultrasonic transducer 400a according to the second example embodiment of the present invention includes acoustic device 100 and an acoustic path Pa.

A third through hole 300ah in housing 300 is located on an extension along the surface of mount substrate 200 opposite to the surface thereof on the side of substrate 110. A sealing portion 310a is provided between the surface of mount substrate 200 on the side of substrate 110 and an inner surface of housing 300. A gap between the surface of mount substrate 200 on the side of substrate 100 and the inner surface of housing 300 is closed by sealing portion 310a. Sealing portion 310 is in a C shape and discontinuous at a portion to define as acoustic path Pa. According to the configuration above, acoustic path Pa detours in housing 300.

Ultrasonic transducer 400a according to the second example embodiment of the present invention can also radiate ultrasound at a high sound pressure level over a wide frequency band by acoustic path Pa satisfying conditions the same as or similar to those in the first example embodiment.

Third Example Embodiment

An ultrasonic transducer according to a third example embodiment of the present invention will be described below with reference to the drawings. Since the ultrasonic transducer according to the third example embodiment of the present invention is different from the ultrasonic transducer according to the first example embodiment of the present invention in the configuration of an acoustic device and an acoustic path, the configuration the same as or similar to that of the ultrasonic transducer according to the first example embodiment of the present invention will not be repeated.

Figure 12:
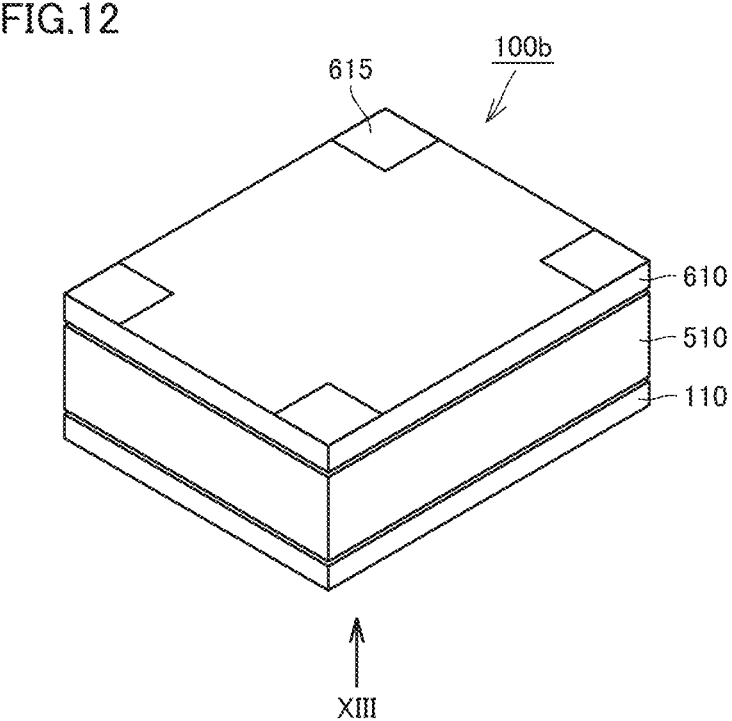
FIG. 12 is a perspective view showing an appearance of an acoustic device included in an ultrasonic transducer according to a third example embodiment of the present invention.
Figure 13:
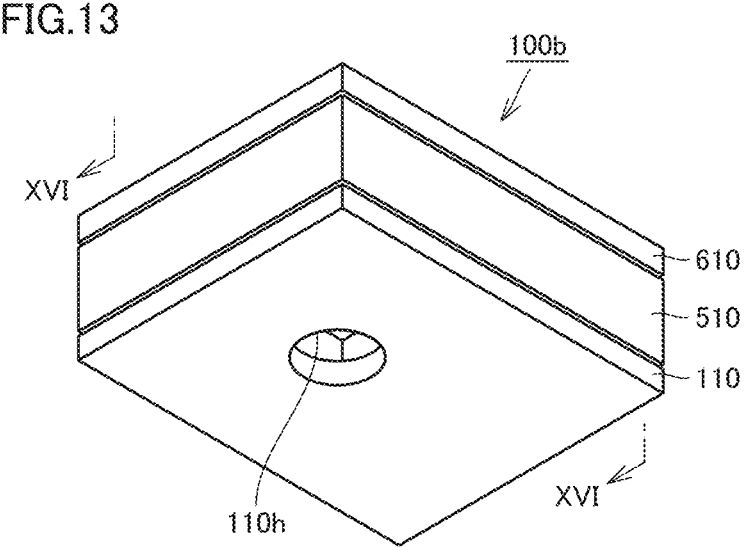
FIG. 13 is a perspective view of an acoustic device in FIG. 12 from a direction shown with an arrow XIII.
Figure 14:
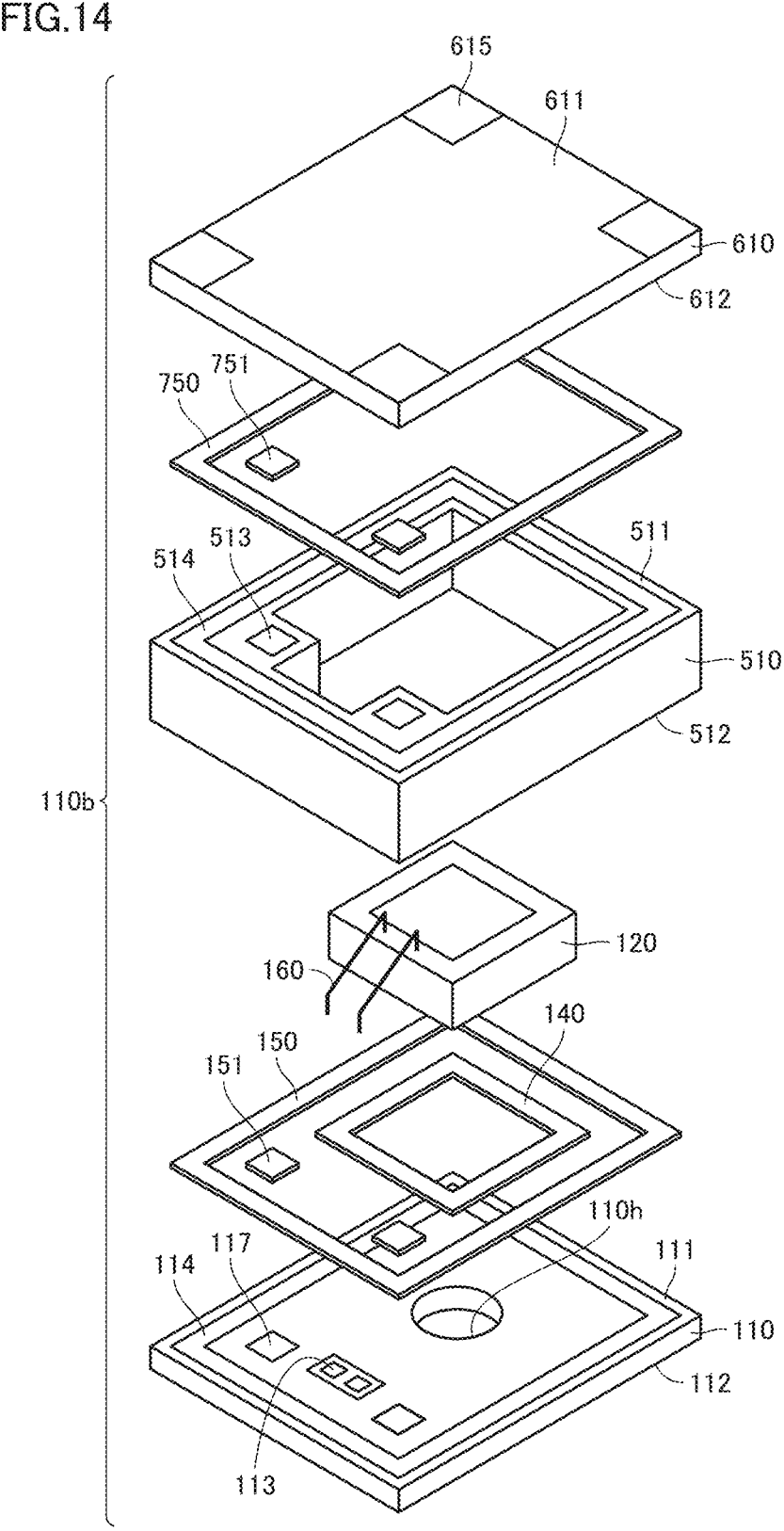
FIG. 14 is an exploded perspective view showing a configuration of an acoustic device from a direction the same as in FIG. 12.
Figure 15:
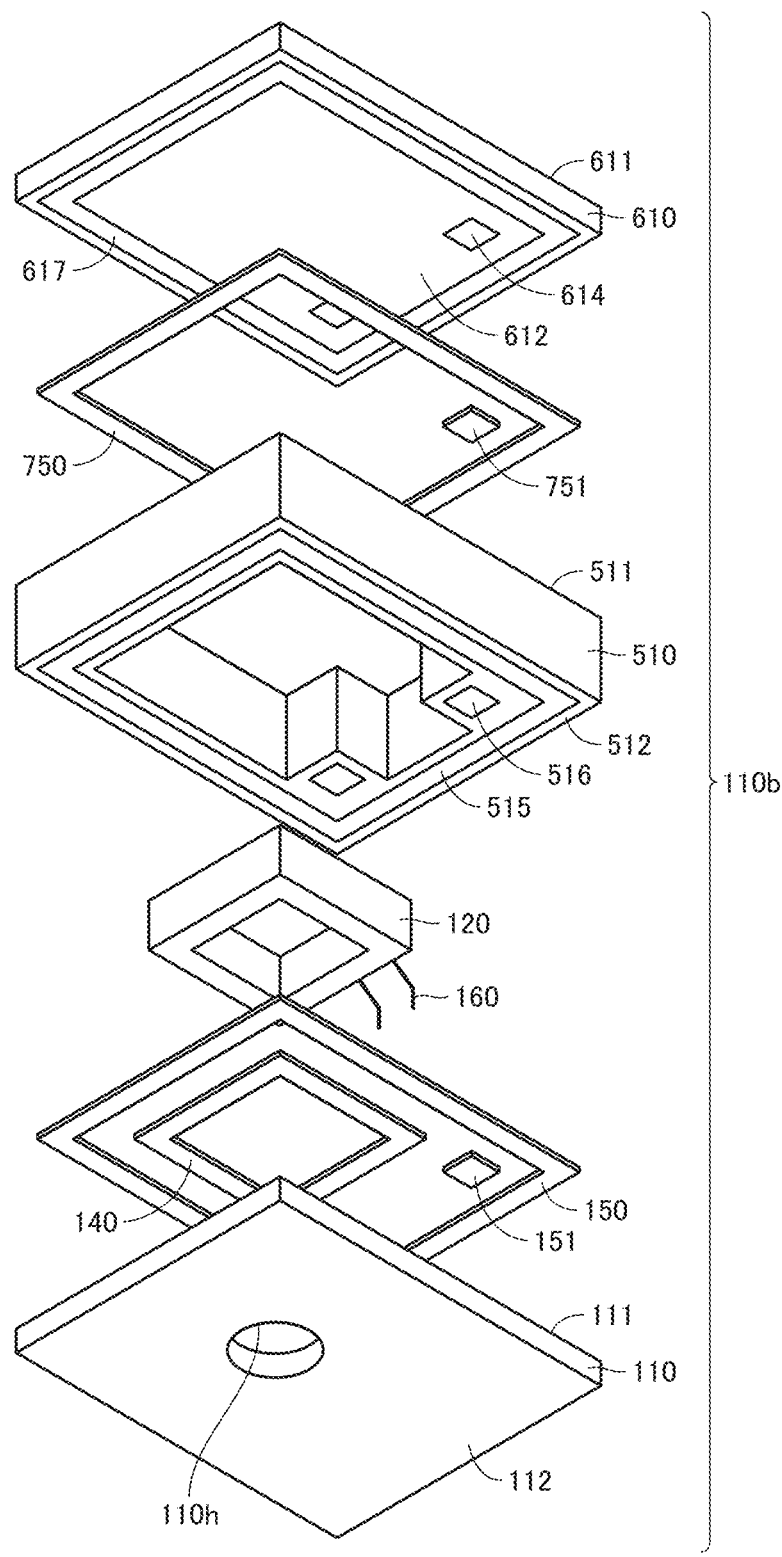
FIG. 15 is an exploded perspective view showing the configuration of an acoustic device from a direction the same as in FIG. 13.
Figure 16:
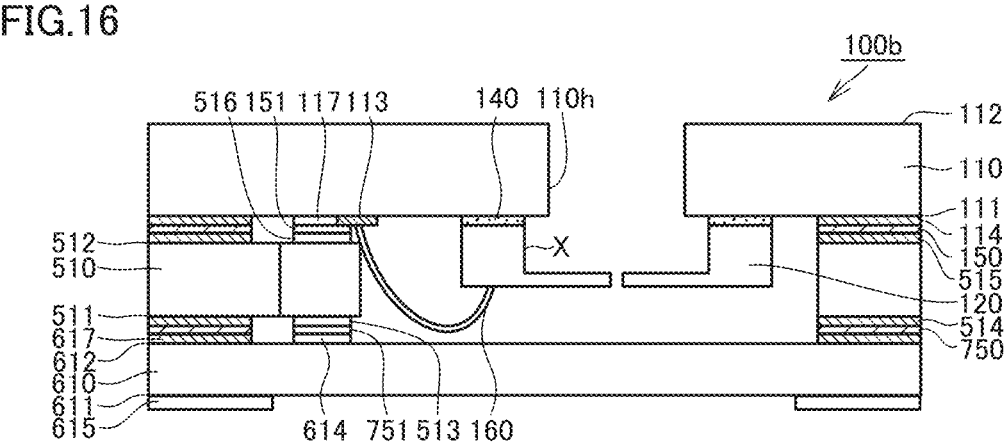
FIG. 16 is cross-sectional view of the acoustic device in FIG. 13 along a direction shown with an arrow XVI-XVI.

FIG. 12 is a perspective view showing an appearance of the acoustic device included in the ultrasonic transducer according to the third example embodiment of the present invention. FIG. 13 is a perspective view of the acoustic device in FIG. 12 from a direction shown with an arrow XIII. FIG. 14 is an exploded perspective view showing the configuration of the acoustic device from a direction the same as in FIG. 12. FIG. 15 is an exploded perspective view showing the configuration of the acoustic device from a direction the same as in FIG. 13. FIG. 16 is cross-sectional view of the acoustic device in FIG. 13 along a direction shown with an arrow XVI-XVI.

As shown in FIGS. 12 to 16, an acoustic device 100b included in the ultrasonic transducer according to the third example embodiment of the present invention includes acoustic MEMS device 120. Acoustic device 100b further includes substrate 110, a hollow spacer 510, and an opposing substrate 610. In the present example embodiment, a plurality of fourth electrodes 117 are provided on first main surface 111 of substrate 110. Fourth electrode 117 is electrically connected to corresponding first electrode 113 through a via electrode or the like. Second electrode 115 and first annular electrode 116 are not provided on second main surface 112 of substrate 110.

Spacer 510 includes a first main surface 511 and a second main surface 512. Spacer 510 has a rectangular or substantially rectangular surrounding shape. Spacer 510 has a rectangular or substantially rectangular outer geometry the same or substantially the same as the outer geometry of substrate 110. A thickness of spacer 510 is adjusted such that acoustic MEMS device 120 and wire 160 are not in contact with opposing substrate 610. A material for spacer 510 is, for example, a material which is combination of resin such as glass epoxy and glass fibers, low temperature co-fired ceramics (LTCC), or ceramic made of alumina.

A plurality of fifth electrodes 513 are provided on first main surface 511 of spacer 510. On first main surface 511 of spacer 510, an electrode 514 having a frame shape is provided along an edge of spacer 510. On second main surface 512 of spacer 510, a plurality of sixth electrodes 516 electrically connected to the plurality of fifth electrodes 513 through via electrodes or the like, respectively, are provided. Sixth electrode 516 is connected to corresponding fourth electrode 117 through a conductive adhesive 151. On second main surface 512 of spacer 510, an electrode 515 with a frame shape is provided along the edge of spacer 510. Electrode 514 is electrically connected to electrode 515 through a via electrode or the like. Electrode 515 is connected to electrode 114 through conductive adhesive 150. Second main surface 512 of spacer 510 is bonded to first main surface 111 of substrate 110 by conductive adhesive 150 around the entire or substantially the entire circumference without a gap.

Opposing substrate 610 includes a first main surface 611 and a second main surface 612. Opposing substrate 610 has a rectangular or substantially rectangular outer geometry the same or substantially the same as the outer geometry of substrate 110. A thickness of opposing substrate 610 is, for example, not smaller than about 0.1 mm and not larger than about 0.3 mm. A material for opposing substrate 610 is, for example, a material which is combination of resin such as glass epoxy and glass fibers, low temperature co-fired ceramics (LTCC), or ceramic made of alumina.

A plurality of second electrodes 615 are provided on first main surface 611 of opposing substrate 610. On second main surface 612 of opposing substrate 610, a plurality of seventh electrodes 614 and an electrode 617 with a frame shape are provided. Electrode 617 is provided along an edge of opposing substrate 610. Second electrode 615 is electrically connected to electrode 617 or corresponding seventh electrode 614 through a via electrode or the like. Electrode 617 is connected to electrode 514 with a conductive adhesive 750 being interposed. First main surface 511 of spacer 510 is bonded to second main surface 612 of opposing substrate 610 by conductive adhesive 750 around the entire or substantially the entire circumference without a gap. Seventh electrode 614 is connected to corresponding fifth electrode 513 with a conductive adhesive 751 being interposed.

According to the configuration above, second electrode 615 is electrically connected to acoustic MEMS device 120 through seventh electrode 614, fifth electrode 513, sixth electrode 516, fourth electrode 117, first electrode 113, and wire 160. As will be described later, in mounting acoustic device 100b on a mount substrate, second electrode 615 is electrically connected to an electrode of the mount substrate.

Figure 17:
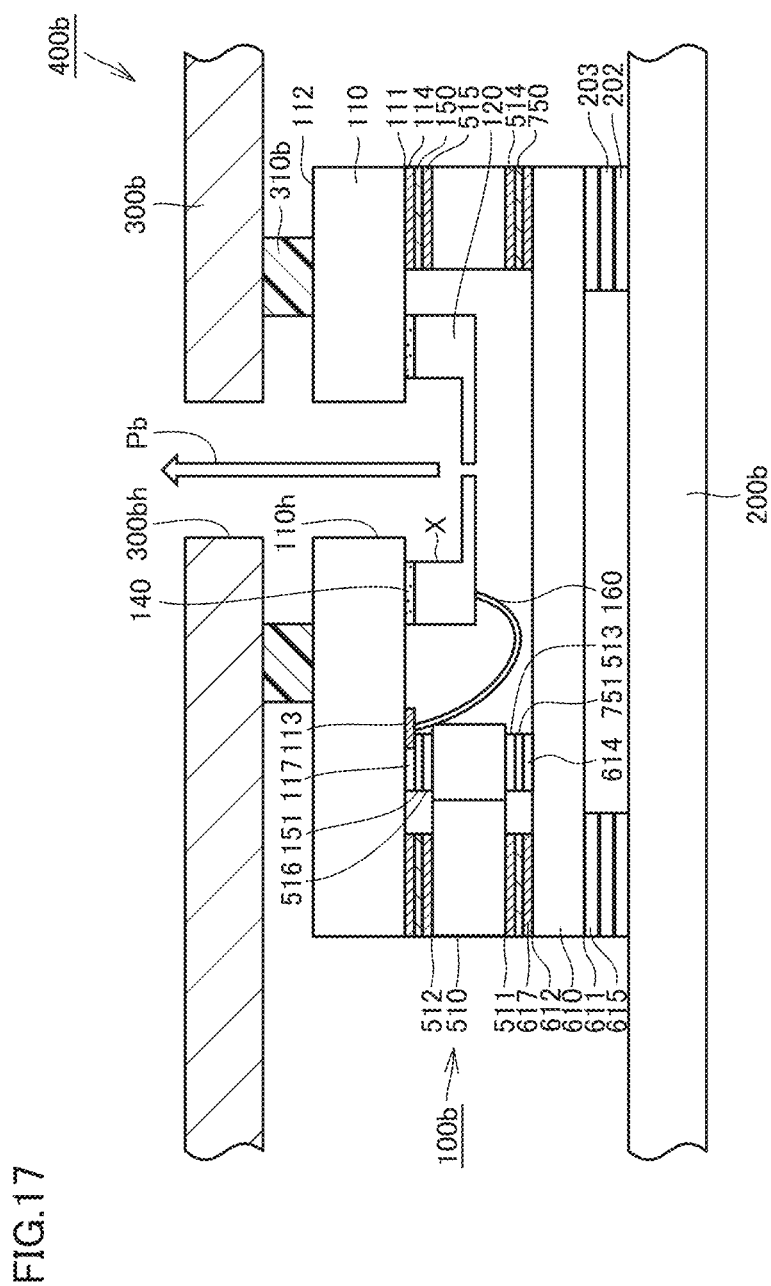
FIG. 17 is a cross-sectional view showing the configuration of the ultrasonic transducer according to the third example embodiment of the present invention.

A configuration of the ultrasonic transducer according to the third example embodiment of the present invention will now be described. FIG. 17 is a cross-sectional view showing the configuration of the ultrasonic transducer according to the third example embodiment of the present invention. As shown in FIG. 17, an ultrasonic transducer 400b according to the third example embodiment of the present invention includes acoustic device 100b and an acoustic path Pb. Acoustic path Pb is constructed to pass through substrate 110 and a housing 300b. Specifically, acoustic device 100b is attached to the inside of housing 300b of an electronic device as being mounted on a mount substrate 200b.

Acoustic device 100b is mounted on mount substrate 200b where second through hole 200h is not provided. Mount substrate 200b faces opposing substrate 610. The plurality of third electrodes 202 are provided on a surface of mount substrate 200b on a side of opposing substrate 610. Each of the plurality of third electrodes 202 is electrically connected to corresponding second electrode 615 of opposing substrate 610 by solder 203.

A third through hole 300bh in housing 300b faces first through hole 110h in substrate 110. A sealing portion 310b is provided between housing 300b and substrate 110. Sealing portion 310b surrounds first through hole 110h and third through hole 300bh. Sealing portion 310b has a surrounding shape. Sealing portion 310b is continuous in the circumferential direction in order to prevent sound leakage through between housing 300b and substrate 110. Sealing portion 310b has an inner diameter of, for example, not smaller than about 0.4 mm and not larger than about 3.0 mm. Sealing portion 310b has a thickness of, for example, not smaller than about 0.1 mm and not larger than about 1.0 mm. Sealing portion 310b is made of resin, for example. According to the configuration above, acoustic path Pb linearly extends.

Ultrasonic transducer 400b according to the third example embodiment of the present invention can also radiate ultrasound at a high sound pressure level over a wide frequency band by acoustic path Pb satisfying conditions the same as or similar to those in the first example embodiment.

Fourth Example Embodiment

An ultrasonic transducer according to a fourth example embodiment of the present invention will be described below with reference to the drawings. Since the ultrasonic transducer according to the fourth example embodiment of the present invention is different from the ultrasonic transducer according to the third example embodiment of the present invention in the configuration of an acoustic path, the configuration the same as or similar to that of the ultrasonic transducer according to the third example embodiment of the present invention will not be repeated.

Figure 18:
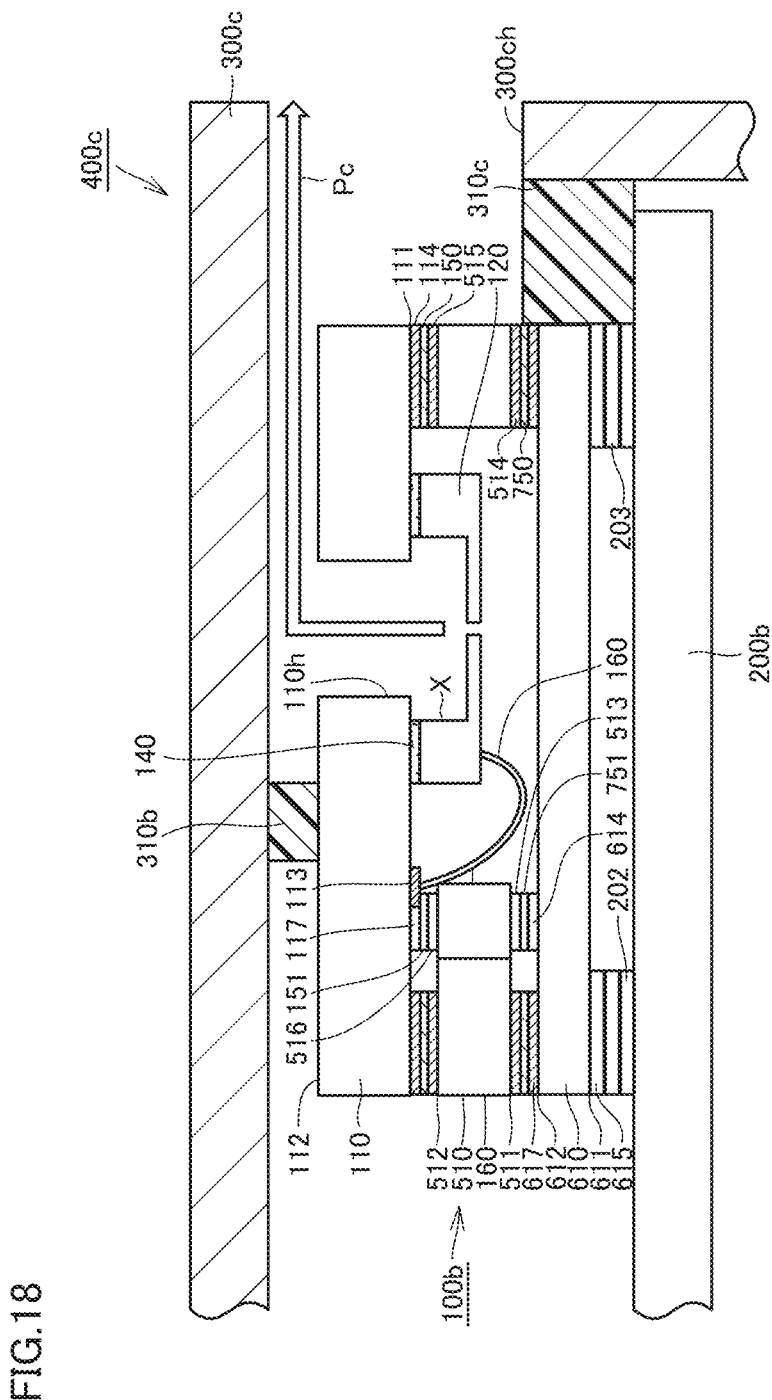
FIG. 18 is a cross-sectional view showing a configuration of an ultrasonic transducer according to a fourth example embodiment of the present invention.

FIG. 18 is a cross-sectional view showing a configuration of the ultrasonic transducer according to the fourth example embodiment of the present invention. As shown in FIG. 18, an ultrasonic transducer 400c according to the fourth example embodiment of the present invention includes acoustic device 100b and an acoustic path Pc.

A third through hole 300ch in a housing 300c is located on an extension along second main surface 112 of substrate 110. Sealing portion 310b is provided between second main surface 112 of substrate 110 and an inner surface of housing 300c. A gap between second main surface 112 of substrate 110 and the inner surface of housing 300 is closed by sealing portion 310b. Sealing portion 310b is in a C shape and discontinuous at a portion to define acoustic path Pc. A sealing portion 310c is provided between the surface of mount substrate 200b on the side of opposing substrate 610 and the inner surface of housing 300c. A gap between the surface of mount substrate 200 on the side of opposing substrate 610 and the inner surface of housing 300 is closed by sealing portion 310c. According to the configuration above, acoustic path Pc detours in housing 300c.

Ultrasonic transducer 400c according to the fourth example embodiment of the present invention can also radiate ultrasound at a high sound pressure level over a wide frequency band by acoustic path Pc satisfying conditions the same as or similar to those in the first example embodiment.

First Experimental Example

Figure 19:
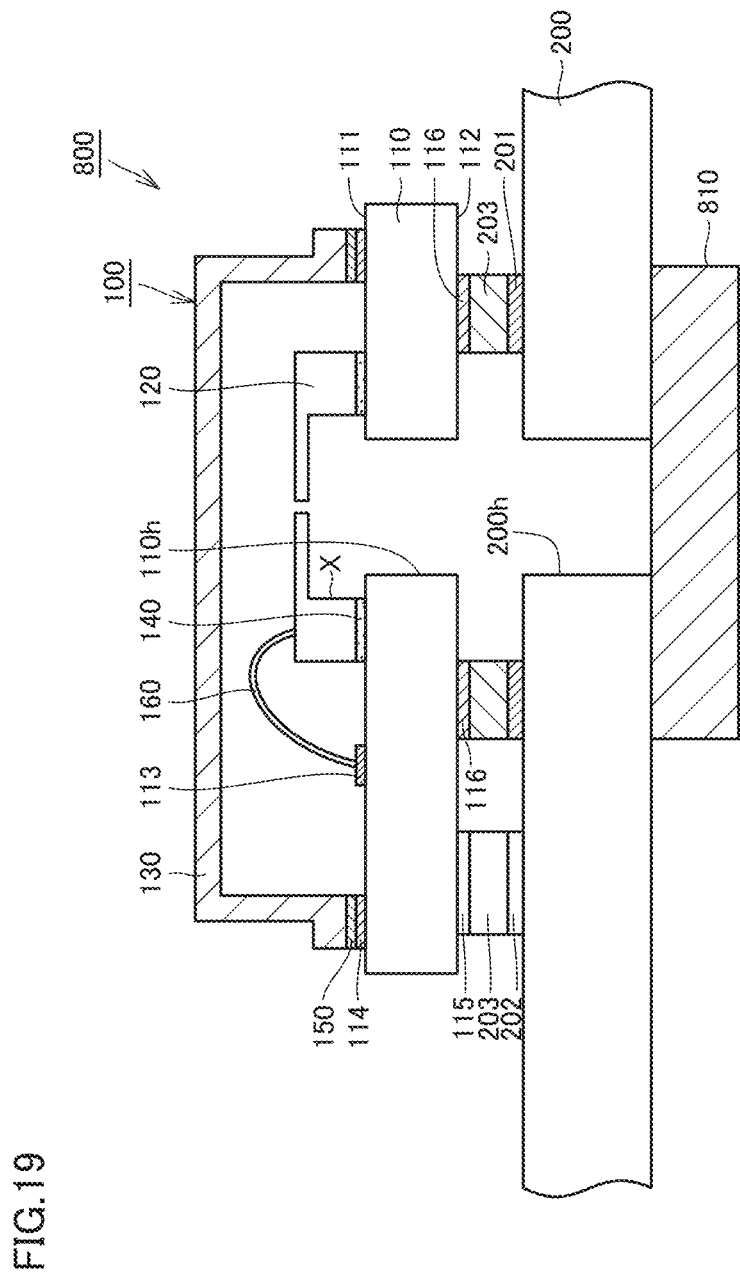
FIG. 19 is a diagram showing a structure of an ultrasonic transducer in a first experimental example.

An experimental example in which resonance frequency f0 of acoustic MEMS device 120 was identified will be described below. FIG. 19 is a diagram showing a structure of an ultrasonic transducer in a first experimental example. As shown in FIG. 19, in an ultrasonic transducer 800 in the first experimental example, second through hole 200h in mount substrate 200 on which acoustic device 100 was mounted was closed with a plate member 810.

In the first experimental example, the thickness of substrate 110 was set to about 0.2 mm, the diameter of first through hole 110h was set to about 0.6 mm, the thickness of base portion 121 was set to about 0.3 mm, the length of one side of the outer geometry of membrane portion 122 was set to about 0.8 mm, the thickness of membrane portion 122 was set to about 3 μm, the width of penetrating slit SL was set to about 1 μm, the diameter of second through hole 200h was set to about 1 mm, the thickness of mount substrate 200 was set to about 1 mm, and the thickness of lid 130 was set to about 0.08 mm.

A frequency at which an amount of displacement of membrane portion 122 was largest was measured as resonance frequency f0 of acoustic MEMS device 120, and it was compared with a result of analysis by acoustic simulation. According to the result of analysis by acoustic simulation, f0 was analyzed as f0=about 43 kHz. According to a result of actual measurement, f0 was measured as f0=about 42 kHz to about 43 kHz, and it was substantially the same as or similar to the result of analysis by simulation. It could be confirmed from the results in the first experimental example that resonance frequency f0 could be identified by observation of the impedance frequency characteristics with second through hole 200h in mount substrate 200 being closed.

Second Experimental Example

Figure 20:
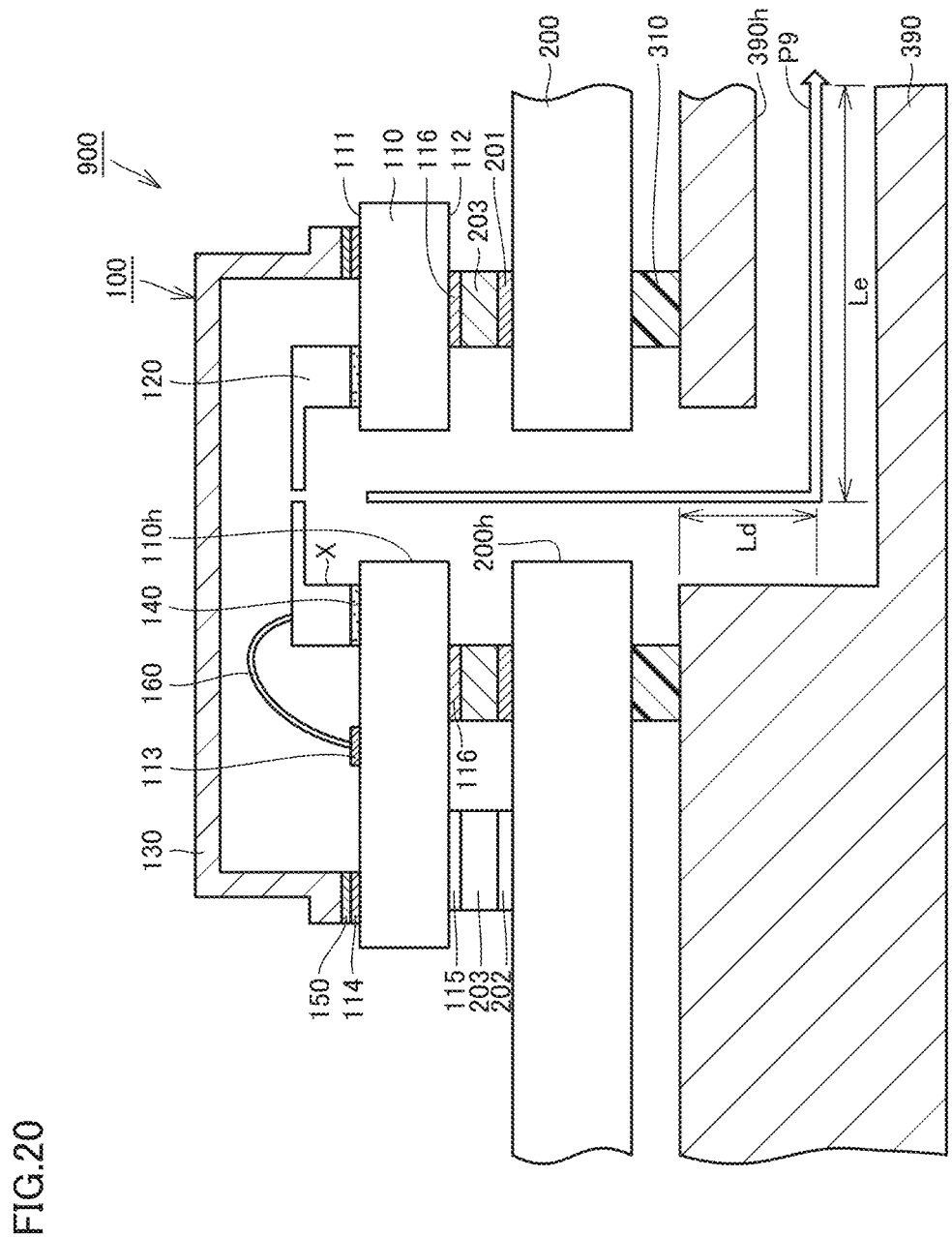
FIG. 20 is a diagram showing a structure of an ultrasonic transducer in a second experimental example.

An experimental example in which analysis by acoustic simulation was conducted with a length of a hole serving as the acoustic path provided in the inside of the housing being varied will now be described. FIG. 20 is a diagram showing a structure of an ultrasonic transducer in a second experimental example. As shown in FIG. 20, an ultrasonic transducer 900 in the second experimental example includes acoustic device 100 and an acoustic path P9.

A housing 390 was provided with a third through hole 390h in an L shape in a vertical cross-section. Third through hole 390h had a diameter of about 1.5 mm. Ld was set to Ld=about 1.5 mm, Le in a comparative example was set to about 5 mm, Le in a first example was set to about 8 mm, and Le in a second example was set to about 11 mm, with Ld representing a depth dimension of third through hole 390h and Le representing a length dimension of an extension of third through hole 390h in acoustic path P9 that passed through a central axis of third through hole 390h. In other words, a length (Ld+Le) of third through hole 390h in the comparative example was set to about 6.5 mm, the length (Ld+Le) of third through hole 390h in the first example was set to about 9.5 mm, and the length (Ld+Le) of third through hole 390h in the second example was set to about 12.5 mm. The diameter of second through hole 200h was set to about 1.1 mm, and other dimensions were the same or substantially the same as those in the first experimental example.

Figure 21:
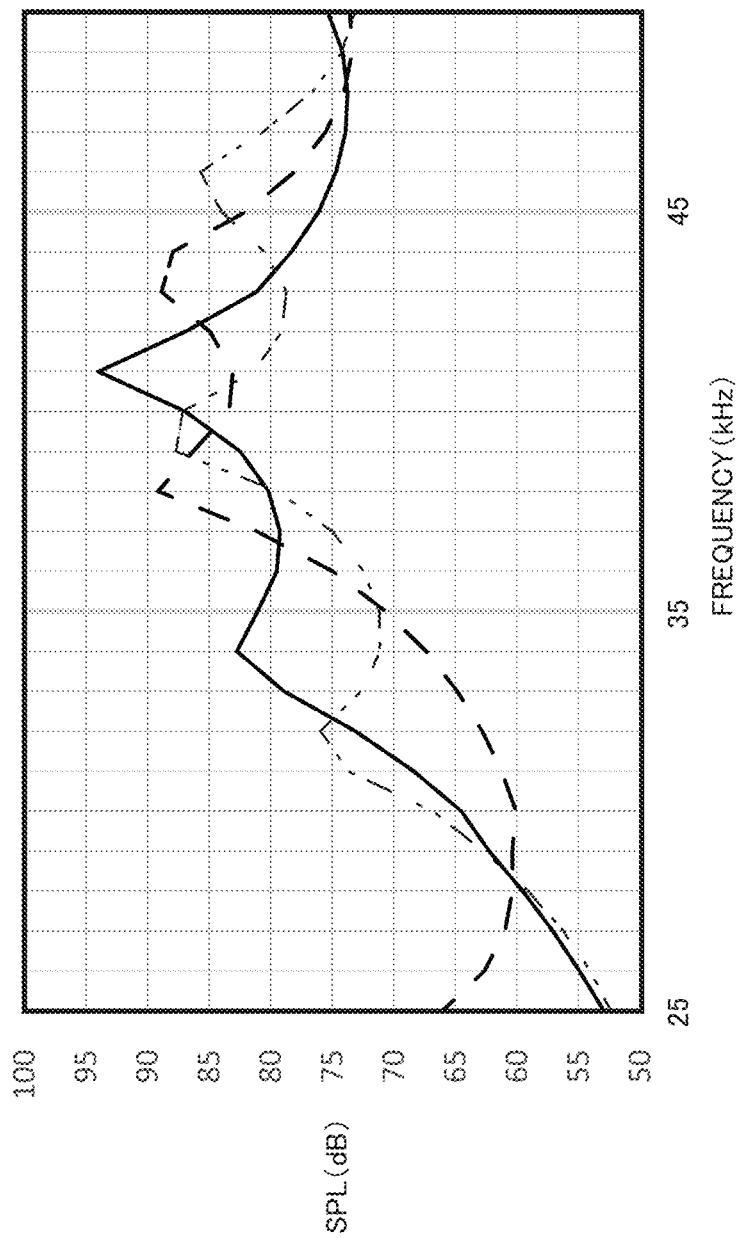
FIG. 21 shows a graph of sound pressure frequency characteristics of the ultrasonic transducers in a comparative example, a first example, and a second example.

FIG. 21 shows a graph of sound pressure frequency characteristics of the ultrasonic transducers in the comparative example, the first example, and the second example. In FIG. 21, SPL (dB) is shown on the ordinate and a frequency (kHz) is shown on the abscissa. The comparative example is shown with a solid line, the first example is shown with a dotted line, and the second example is shown with a chain double-dotted line.

As shown in FIG. 21, the ultrasonic transducers according to the comparative example, the first example, and the second example each had two sound pressure peaks. Resonance frequency f0 was about 43 kHz according to the result in the first experimental example. Frequency f1 in the comparative example was about 41 kHz, frequency f1 in the first example was about 38 kHz, and frequency f1 in the second example was about 39 kHz. Frequency fh in the comparative example was not lower than about 50 kHz, frequency fh in the first example was about 43 kHz, and frequency fh in the second example was about 46 kHz.

(SPLmax−SPLmin) in the comparative example was about 20.2 dB, (SPLmax−SPLmin) in the first example was about 6.1 dB, and (SPLmax−SPLmin) in the second example was about 9.0 dB. The result (f0−f1)/f0×100=about 4.7 was obtained in the comparative example, the result (f0−f1)/f0×100=about 11.6 was obtained in the first example, and the result (f0−f1)/f0×100=about 9.3 was obtained in the second example.

It could be confirmed based on results in the second experimental example that there was a difference between the sound pressure peaks by at least about 20 dB in the frequency band from f1 to fh in the ultrasonic transducer according to the comparative example which did not satisfy relationship of about $5 \leq (f0-f1)/f0 \times 100 \leq$ about 33 whereas the difference between the sound pressure peaks was not more than about 10 dB in the frequency band from f1 to fh in the ultrasonic transducers according to the first example and the second example which satisfied relationship of about $5 \leq (f0-f1)/f0 \times 100 \leq$ about 33 and those ultrasonic transducers could radiate ultrasound at the high sound pressure level over the wide frequency band.

Features that can be combined in the description of the example embodiments and the experimental examples above may be combined with one another. The conductive adhesive described above may be solder.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An ultrasonic transducer comprising:
   an acoustic device including an acoustic MEMS device; and
   an acoustic path in which ultrasound generated by vibration of the acoustic MEMS device can resonate, the acoustic path communicating with the acoustic MEMS device; wherein
   the ultrasonic transducer has sound pressure frequency characteristics such that a plurality of sound pressure peaks occur as a result of a combination of resonance of the acoustic MEMS device and resonance in the acoustic path; and
   a relationship of $5 \leq (f0-f1)/f0 \times 100 \leq 33$ is satisfied, where f0 represents a resonance frequency of the acoustic MEMS device and f1 represents a frequency lower than the resonance frequency f0 and closest to the resonance frequency f0 among frequencies at which the plurality of sound pressure peaks occur in the sound pressure frequency characteristics.

2. The ultrasonic transducer according to claim 1, wherein ultrasound at a frequency within a frequency band not lower than f1 and not higher than fh is radiated to outside through the acoustic path, where fh represents a frequency higher than the resonance frequency f0 and closest to the resonance frequency f0 among the frequencies at which the plurality of sound pressure peaks occur in the sound pressure frequency characteristics.

3. The ultrasonic transducer according to claim 2, wherein the frequency of ultrasound radiated to the outside through the acoustic path can be selected from among a plurality of frequencies within the frequency band.

4. The ultrasonic transducer according to claim 2, wherein ultrasound at a frequency at which a sound pressure is lowest within the frequency band is radiated to the outside through the acoustic path.

5. The ultrasonic transducer according to claim 1, wherein the acoustic device includes a substrate on which the acoustic MEMS device is provided and a lid covering the acoustic MEMS device.

6. The ultrasonic transducer according to claim 5, wherein the substrate includes first and second main surfaces, and a through hole extending from the first main surface to the second main surface.

7. The ultrasonic transducer according to claim 5, wherein the substrate has a rectangular or substantially rectangular shape;
   a length of the substrate is not smaller than 1 mm and not larger than 3 mm; and
   a thickness of the substrate is not smaller than 0.1 mm and not larger than 0.3 mm.

8. The ultrasonic transducer according to claim 5, wherein the acoustic MEMS device includes a pad electrode;
   the substrate includes a plurality of first electrodes on a first main surface of the substrate; and
   the pad electrode is electrically connected to the one of the plurality of first electrode by a wire.

9. The ultrasonic transducer according to claim 5, wherein a frame shaped electrode is provide along an edge of the substrate.

10. The ultrasonic transducer according to claim 5, wherein the lid is connected to a first main surface of the substrate by a conductive adhesive.

11. The ultrasonic transducer according to claim 5, wherein the lid includes metal or resin.

12. The ultrasonic transducer according to claim 5, wherein the lid has a thickness of not smaller than 0.05 mm and not larger than 0.3 mm.

13. The ultrasonic transducer according to claim 5, wherein
   a first annular electrode is provided on a first main surface of the substrate; and
   the lid is electrically connected to the first annular electrode by a conductive adhesive.

14. The ultrasonic transducer according to claim 5, wherein the lid is fixed to a first main surface of the substrate by a die bonding agent.

15. The ultrasonic transducer according to claim 14, wherein the die bonding agent is a thermosetting adhesive.

16. The ultrasonic transducer according to claim 1, wherein the acoustic MEMS device includes a base portion and a membrane portion.

17. The ultrasonic transducer according to claim 16, wherein the base portion includes a support layer, an intermediate layer, and a multilayer body including a plurality of layers.

18. The ultrasonic transducer according to claim 17, wherein the support layer includes single-crystal silicon.

19. The ultrasonic transducer according to claim 17, wherein the intermediate layer includes $SiO_2$.

20. The ultrasonic transducer according to claim 17, wherein the multilayer body includes at least one of a piezoelectric body layer, an elastic body layer, an upper electrode layer, and a lower electrode layer.

* * * * *